United States Patent [19]

Mercik, Jr. et al.

[11] 4,102,178
[45] Jul. 25, 1978

[54] GAS IN COOLANT DIAGNOSTICS FOR INTERNAL COMBUSTION ENGINE

[75] Inventors: Henry J. Mercik, Jr., Enfield; Henry E. Goetsch, Windsor, both of Conn.

[73] Assignee: United Technologies Corporation, Hartford, Conn.

[21] Appl. No.: 781,094

[22] Filed: Mar. 25, 1977

[51] Int. Cl.² .................................... G01M 15/00
[52] U.S. Cl. ........................................... 73/49.7
[58] Field of Search ............... 73/117.3, 116, 211, 73/118, 45.8, 49.7; 123/41.15

[56] References Cited

U.S. PATENT DOCUMENTS

| | | | |
|---|---|---|---|
| 2,171,113 | 8/1939 | Hopkins | 73/45.8 X |
| 2,328,289 | 8/1943 | Morgan et al. | 73/211 X |
| 3,292,427 | 12/1966 | Mattson | 73/118 |

*Primary Examiner*—Jerry W. Myracle
*Attorney, Agent, or Firm*—M. P. Williams

[57] ABSTRACT

A measurement of the quantity of gas entering or within the coolant of an internal combustion engine cooling system, is made with the engine running, preferably at high idle speed, and a test is performed to ensure that the thermostat is open, whereby it is known that coolant is circulating through the entire cooling system, by providing a radiator cap connected to an orifice of a known size that will allow gas to escape from the cooling system and measuring substantially the pressure differential across the orifice, such as by measuring the pressure on the radiator side of the orifice with respect to atmospheric pressure.

5 Claims, 6 Drawing Figures

GAS IN COOLANT DIAGNOSTICS FOR INTERNAL COMBUSTION ENGINE

CROSS REFERENCE TO RELATED APPLICATIONS

The apparatus disclosed herein may determine the number of teeth on a flywheel for speed measurements in accordance with a commonly owned, copending application, Ser. No. 684,037, now U.S. Pat. No. 4,015,466 DETERMINATION OF NUMBER OF TEETH ON AN INTERNAL COMBUSTION ENGINE FLYWHEEL, filed on May 7, 1976 by Stick et al., or Ser. No. 747,755, WAVEFORM COUNT OF TEETH ON AN INTERNAL COMBUSTION ENGINE FLYWHEEL, filed on Dec. 6, 1976 by Pettingell et al.

FIELD OF ART

This invention relates to electronic diagnosis of internal combustion engines, and more particularly to measurement of the gas in the coolant of the cooling system thereof.

BACKGROUND OF THE INVENTION

A critical parameter of certain internal combustion engines such as diesel engines, is the presence of any gas (such as combustion product or air) in the coolant of the cooling system. This is particularly true in the case of engines which have cylinder sleeves that are designed for operation at high pressures and therefore high temperatures, as is the case in most diesel engines. A small amount of gas in the coolant can be catastrophic due to the fact that the bubbles of gas have a tendency to collect on the outside surfaces of the cylinder sleeves, thereby providing an insulation barrier between the coolant and the sleeve. As a consequence, sleeve hot spots can result, which when carried to the extreme, cause a breach in the engine which can totally wreck it.

A further problem is the fact that this condition can exist without manifesting any indication thereof in the normal cooling system thermometer in the cab of the vehicle in which the engine is mounted. Even though very large leaks in head gaskets and the like can result in coolant being drawn into the engine, and manifest itself in either the quality or quantity of the engine oil, smaller leaks, incapable of allowing liquid to pass therethrough on a relatively low pressure suction stroke, can nonetheless allow combustion gases to pass therethrough into the coolant as a consequence of the much higher pressure strokes.

Since the seriousness of this condition is well known, a test has previously been used to determine the presence of excessive gas in the coolant of an engine. This test provides a radiator cap having a hose attached thereto, the hose being passed loosely into the neck of a bottle full of water which is standing upside down with its opening below the level of water in a bucket. The time required to displace all of the water in the bottle is utilized as a measure of the amount of gas in the coolant. The problem with this test is that it is cumbersome and somewhat difficult to perform with ordinary buckets and bottles. A further problem is, because of the undesirability of performing such a test, the test is rarely performed; in fact, the failure to perform any such test leaves many vehicles found wanting for minor repair of head gasket leaks, prior to destruction of the engine.

SUMMARY OF THE INVENTION

Objects of the invention include improved measurement of gas in the coolant of an engine cooling system, simple and fast measurement of quantities of gas in the coolant of an engine cooling system, and automated measurement of gas in the coolant of an engine cooling system.

According to the present invention, gas accumulations in the cooling system of an engine are allowed to escape, such as from the radiator cap, through a small orifice, the pressure across which is measured with the engine running and the thermostat open. In further accord with the invention, a measure of the flow of gas outflow of engine coolant is predicated on assurance that the thermostat is open so that coolant is circulating through the entire cooling system. In still further accord with the present invention, a substitute radiator cap is provided with a small orifice and a pressure transducer to measure substantially the pressure differential across the orifice as the engine is operated with the thermostat open, measurements of coolant temperature, and pressure across the orifice, being made automatically.

The present invention provides a test which is readily incorporated in an engine diagnostic system which provides a plurality of tests. The test is simple, thereby assuring that it will be performed as a normal diagnostic procedure. The test can readily be performed in a very short period of time and is highly accurate and reliable.

The foregoing and other objects, features and advantages of the present invention will become more apparent in the light of the following detailed description of preferred embodiments thereof, as illustrated in the accompanying drawing.

DETAILED DESCRIPTION

Figure 1:
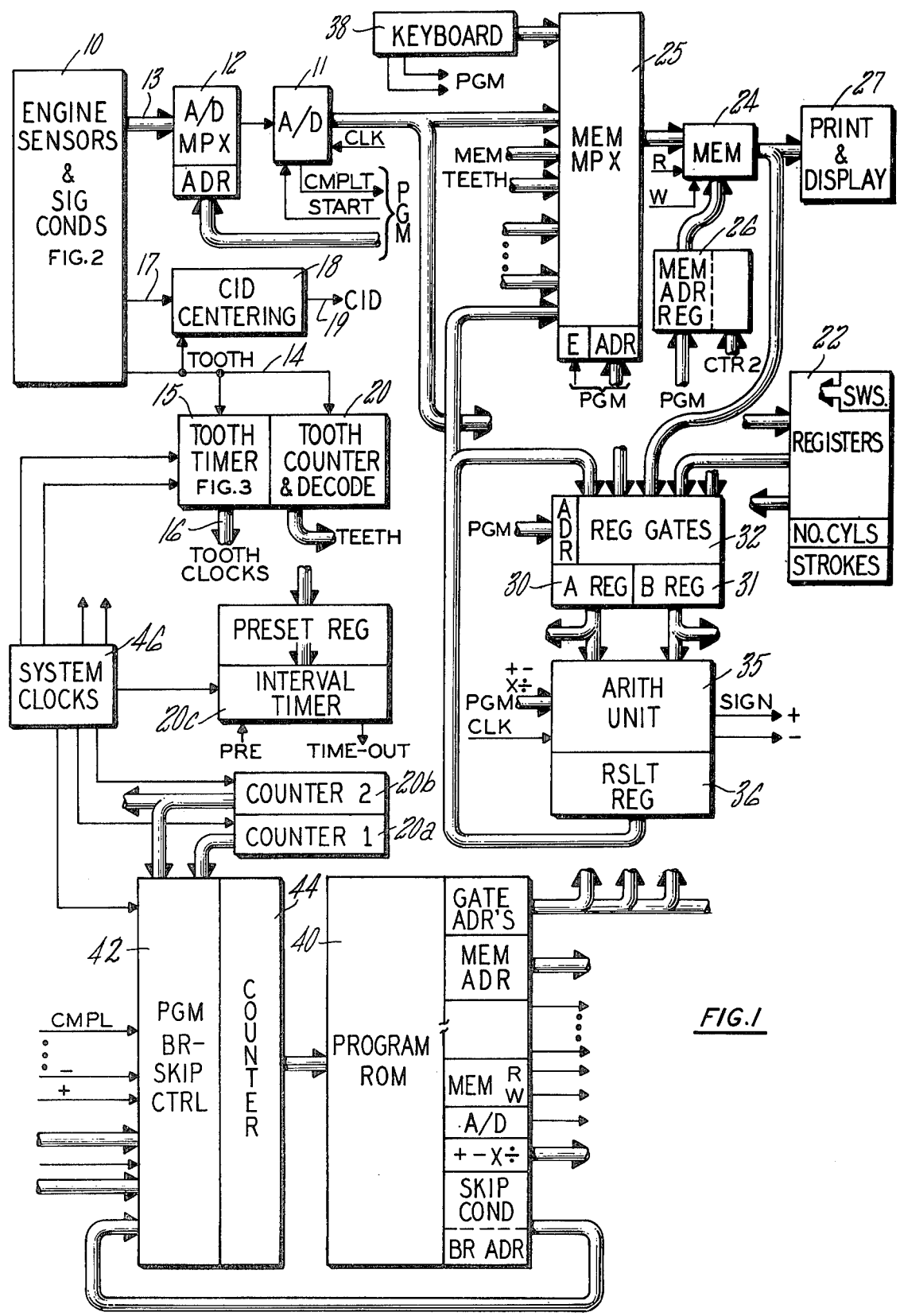
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters of discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displaced in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
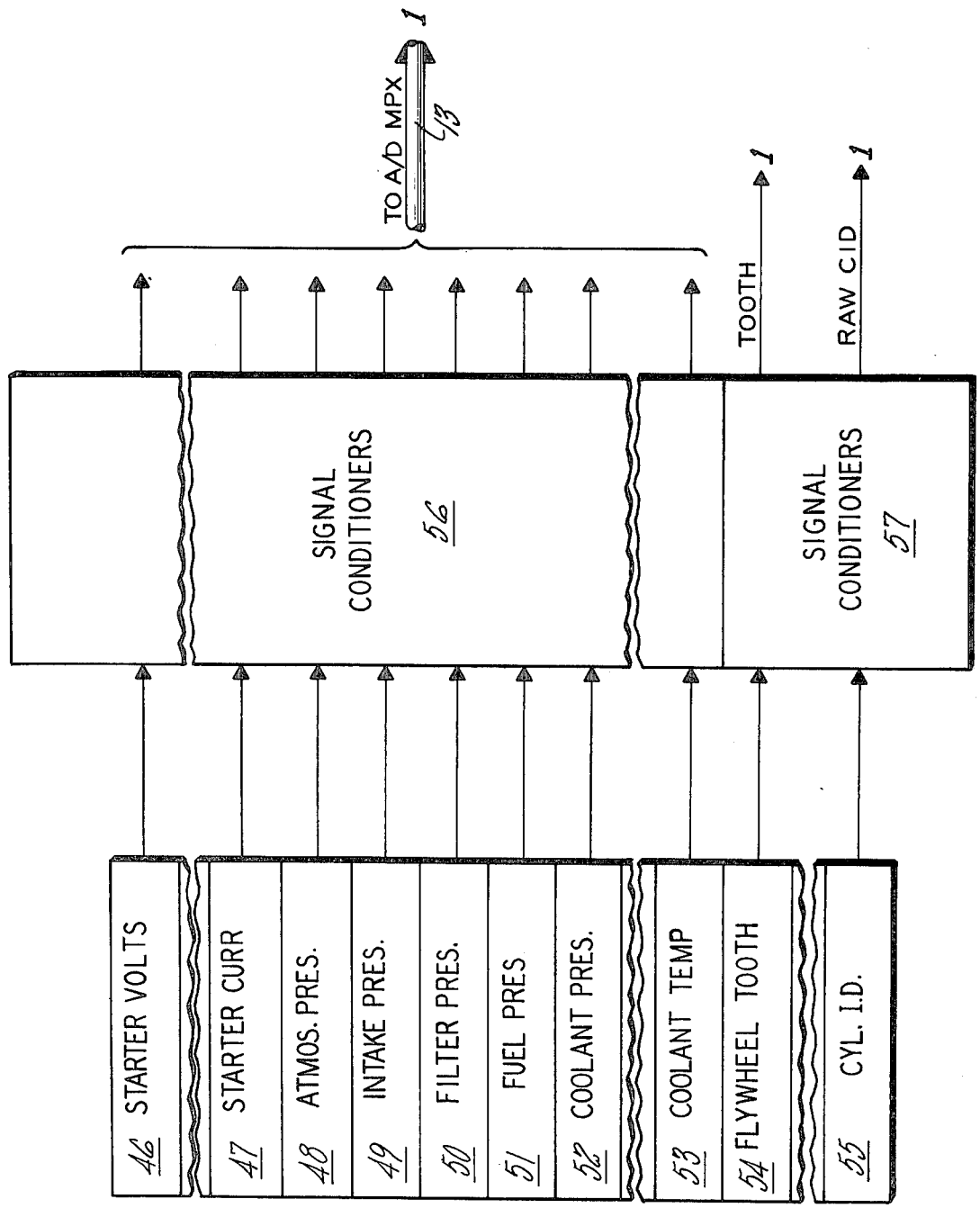
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter outer unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
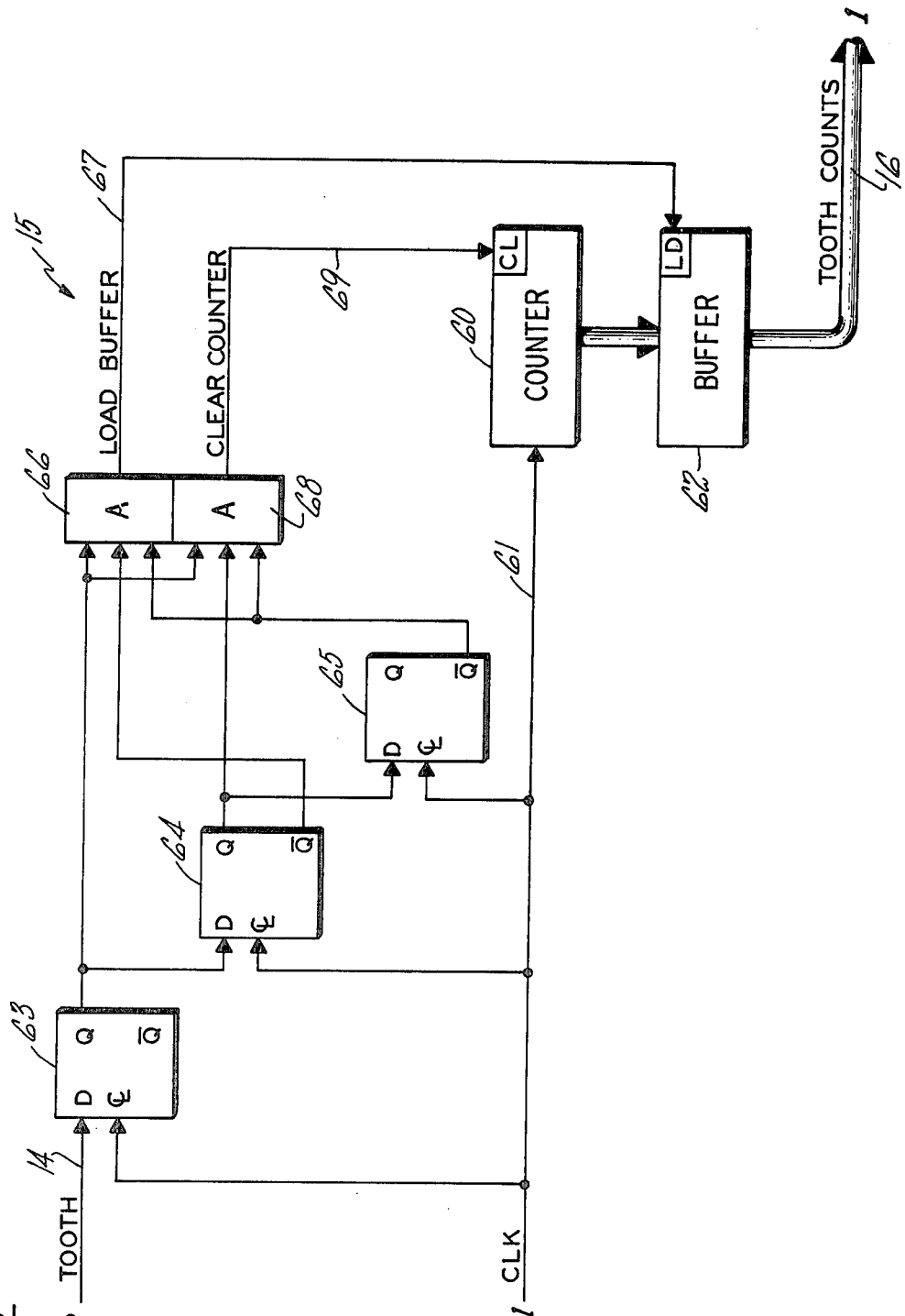
FIG. 3 is a simplified schematic diagram of tooth timer means for obtaining instantaneous, sub-cycle engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al., Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)" indicate addresses, chosen at will by the programmer, or partially determined by counter two, if so indicated.

Figure 4:
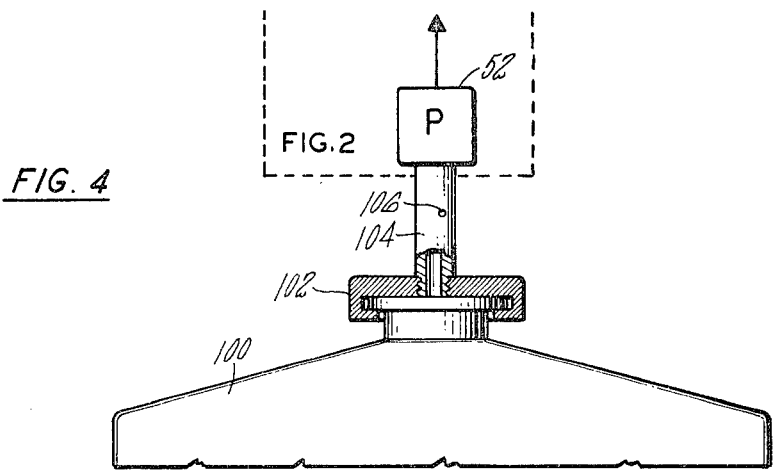
FIGS. 4–6 are simplified schematic illustrations of exemplary orifice and pressure sensor fixtures used in the invention.

As is well known, the mass flow of a fluid (including gas) through an orifice is determinable from the area of the orifice and the pressure drop across is. Referring now to FIG. 4, a radiator 100 is fitted with a special cap 102, in place of the regulator cap, which is fastened to a conduit 104 having an orifice 106 therein, the pressure in the conduit 104 being monitored by the coolant pressure sensor 52 (FIG. 2). If there is any gasification of the coolant in the radiator 100, the gas will flow outwardly through the orifice 106, and the pressure across the orifice, typically less than 1 psi, represented by the pressure in the pressure sensor 52 against ambient pressure, will provide a measure of the rate of mass flow of gas per unit of time.

The orifice 106 may be very small, on the order of 30 mils; any smaller orifice would be subject to blockages due to moisture, dust, oil film and the like; any larger orifice would reduce the pressure differential thereacross to such a low value that only highly precise laboratory measuring equipment could accurately measure it. Obviously, these two factors are to be avoided in a shop environment.

Figure 5:
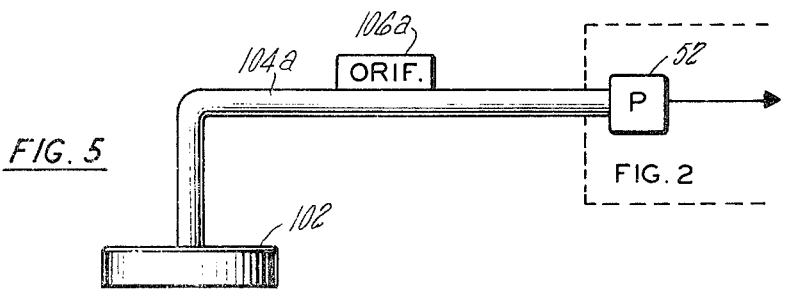
Figure 6:
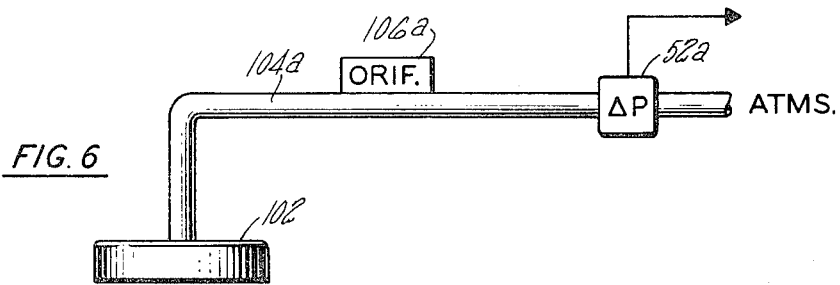

If desired, instead of a simple orifice 106, the invention may use an effective orifice 106a (FIG. 5), which consists of three larger orifices in series (such as on the order of 40 mils), which together have an effective orifice sized for gaseous flow in the range involved herein (which is essentially the same as a single orifice of on the order of 30 mils). The effective orifice 106a, sometimes referred to as a triplet, is available in the market. The effective orifice 106a may be disposed in communication with the conduit 104a, which is connected to the pressure sensor 52 in FIG. 5 in the same fashion as in FIG. 4. However, because the pressure differences herein involved are so small, reliance on any, nominal, unmeasured atmospheric pressure as representing the pressure on the downstream end of the orifice may not give desired results. In that case, it may be desired to utilize a pressure differential device 52a as illustrated in FIG. 6. This device will directly measure the difference in pressure at its two inlets, thereby providing an accurate measure of the pressure difference across the orifice 106a. Or, if found necessary or desirable in any given implementation of the present invention, a separate atmospheric pressure measurement may be made for subtraction from the pressure measurement made of the pressure sensor 52.

The test herein simply determines first, that the engine is at high idle speed, so that warming up of the coolant is most likely assured. Second, the warm coolant results in an opening of the thermostat, thus in turn assuring that the coolant is circulating through the engine and the radiator. Thus any tendency for combustion gases to enter the coolant in the water jacket, such as may occur with a leaky head gasket or leaky cylinder sleeves, will result in gas in the coolant within the radiator 100. Also, air can enter the coolant due to leaks to the atmosphere on the low pressure side of the coolant pump; and this air will be assured of reaching the radiator under such conditions. Of course, the test could be performed by measuring the out gasing of the coolant at any suitable point of the cooling system, if one could be found; however, a test at the radiator involves the complete cooling system when the thermostat is open. Third, once the temperature indicates that the coolant is circulating through the full system, the measuring of the pressure across the orifice may be delayed for a short period of time to ensure a stabilized flow of gas through the orifice. And fourth, the pressure or pressure difference is measured.

The test herein is made by accelerating the engine to high idle, and when the speed is checked to assure high idle, the temperature is checked to see if it is over rated thermostat temperature to ensure that coolant is circulating. Then the pressure measurement is made.

The speed measurements are made herein by the tooth sensor 54 and tooth timer 15, which sense the passage of teeth and record a count of the number of clock signals fed to the counter on a tooth-to-tooth basis. The number of flywheel or ringgear teeth (RGT) can be determined from manufacturer's specifications and provided in either a register or a predetermined location in memory prior to test. Or, if desired, the teachings of either the aforementioned Stick et al. or Pettingell et al. applications may be utilized to determine the number of ringgear teeth on the flywheel and made available in memory; none of this forms any part of the present invention. The fraction of a revolution traversed as each tooth passes the sensor is simply the ratio of one divided by the total number of teeth. The time for that fraction of a revolution to occur is simply the counts of the interval time divided by the frequency of clock signals fed to the interval time. Since frequency of clock feeding the counter is expressed in Hz, and speed is normally expressed in revolutions per minute, a factor of 60 must be employed in a well known fashion. To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). When comparing the actual speed of the engine as determined by the tooth timer with predetermined speeds (such as high idle speed herein), the position of speed and counts in the relationship described hereinbefore can be reversed, and the number of counts which the tooth timer will have when the engine has a predetermined speed can be precalculated and ready to use. This is done generally by multiplying the frequency of the clock times 60, all of which is divided by the product of the total number of teeth on the flywheel and the desired starting speed in rpm. This can be accomplished in the exemplary diagnostic system of FIG. 1, assuming the specification speed to test for a high idle speed (e.g., test to see if in excess of about 2200 rpm) is available in memory, with the following instructions, after informing the operator to accelerate the engine:

1. Display "Hi Spd"
2. Load MEM (Freq) to A REG
3. Load MEM (RGT) to B REG
4. Divide
5. Load RSLT to A REG
6. Load MEM (2200 RPM) to B REG
7. Divide
8. Load RSLT to A REG
9. Load 60 Factor to B REG
10. Multiply
11. Load RSLT to B REG
12. Load Tooth timer to A REG
13. Subtract
14. Skip one if —
15. Branch to 12

Having checked to see that the engine is idling above rated speed, the system will now check to see that the temperature of the coolant (indicated by sensor 53, FIG. 2) is at least 185° (or such other value that indicates the thermostat is open). The following exemplary process assumes that a factor is available in memory which is representative of the rated thermostat temperature for comparison purposes, in a well known fashion:

16. Load MEM (185°) to A REG
17. A/D MPX to Coolant Temp
18. Start A/D
19. Skip one if CMPLT
20. Branch to 19
21. Load A/D to B REG
22. Subtract
23. Skip two if —
24. Display Error
25. End Having determined that the speed and temperature are proper, the system can now begin the test.

In accordance with the present invention, the outgassing of the radiator can be measured substantially instantaneously, since the pressure difference across an orifice is an ample measurement of the mass flow through the orifice; and the pressure measured herein is either the pressure at the upstream end of the orifice compared to atmospheric or ambient pressure, or if desired, can be made by a differential pressure reading which will also take into account ambient, by suitable positioning of a proper differential pressure device. As used herein, the pressure across the orifice is defined to include the actual differential pressure or the pressure of the upstream side of the orifice above atmospheric pressure. If the present invention is incorporated in a diagnostic system of the type illustrated in FIGS. 1 and 2, it may include an atmospheric pressure sensor 48 (FIG. 2), a simple pressure reading at the orifice may be combined therewith if desired; or, as illustrated in FIG. 6, a differential pressure device may be utilized at the orifice.

In any event, the present invention contemplates ensuring that gas flow, if any, is likely to be well established through the orifice by providing for a slight time delay, after rated speed and thermostat operation have been assured, as described with respect to instructions 1–25 hereinbefore. In the exemplary embodiment herein, the interval timer 20c is used to establish a time delay of five seconds after the conditions are proper and before the single pressure measurement is made to determine the mass flow through the orifice. This may be accomplished in accordance with the following exemplary instructions:

26. Load MEM (5 sec) to Preset Reg
27. Start Interval timer
28. Skip one if time out
29. Branch to 28

And now the pressure can be measured as follows:

30. A/D MPX to Coolant Pres
31. Start A/D
32. Skip one if CMPLT
33. Branch to 32
34. Load A/D to MEM (Pres)
35. Display "Lo Spd"

The last instruction simply indicates that the test is over, and the engine may be allowed to resume low idle speed.

If a simple pressure device (as in FIGS. 4 and 5) is used, then atmospheric pressure may be sensed, if desired and the pressure difference determined as follows:

36. A/D MPX to Atmos Pres
37. Start A/D
38. Skip 1 if CMPLT
39. Branch to 38
40. Load A/D to B REG
41. Load MEM (Pres) to A REG
42. Load RSLT to MEM (Pres)

Of course, if the differential pressure device of FIG. 6 is utilized, then the correct pressure will have been provided in instruction 35. In either event, the pressure is now available in memory, and in accordance with the invention, may be displayed or otherwise manifested as an indication of the coolant gasification. If desired, although not shown herein for simplicity, the pressure reading may be converted utilizing well known physical principles, related to the diameter of the orifice utlized, to provide an indication in terms of the mass flow of effluent, such as in terms of volume of gas per unit of time (such as quarts per minute) if found suitable in any given utilization of the present invention; otherwise, the pressure may be displayed in terms of inches of water, or in terms of fractional psi, as desired. but with or without conversion, the test may end a follows:

43. Load MEM (Pres) to Display
44. Branch to 25

The exemplary embodiments of the invention herein are disclosed in conjunction with an automated vehicle diagnostic system, in which speed is measured to ensure a good flow through the cooling system, and to ensure that the coolant will warm up so that the thermostat will open for full system coolant circulation. And, the temperature is automatically measured to ensure that the thermostat is open. However, it is apparent that the test in accordance with the invention need not necessarily utilize these prerequisites, if the opening of the thermostat is assured in another way, such as manually sensing warmth in the radiator, or the like. Similarly, although the invention measures pressure using electric pressure transducers, in its most simplest form, the invention may be practiced with only a pressure-monitored orifice, the pressure of which may be visually read from a gage. However, the invention does encompass the automated testing disclosed herein, although it should be understood that the particular processing apparatus and the exemplary program steps therefor set out hereinbefore form no part of the present invention. The invention may be implemented in a wide variety of ways well within the skill of the art. For instance, tests of this type, if not being performed in an overall diagnostic system of the general type described with respect to FIG. 1 hereinbefore, may be more practical to implement with analog measuring apparatus. But if a high degree of resolution and sophistication is desired, then the digital techniques described herein may be preferable. Obviously the present test alone could be performed with special purpose digital equipment which is far simpler than the overall system described hereinbefore. Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent of the United States is:

1. In the method of measuring gas in the cooling system of an engine, the steps of:
    providing a radiator cap having a pressure sensor means connected thereto in gaseous communication with the interior of the radiator cap and having a small orifice of known size in gaseous communication with the interior of the radiator cap for allowing gas within the radiator to escape through the orifice with the cap disposed on the radiator;
    operating the engine;
    determining that the thermostat of the cooling system under test is open; and
    measuring the pressure on the radiator side of the orifice.

2. A method according to claim 1 wherein said measuring step comprises measuring the pressure drop across the orifice.

3. In a method of measuring gas in the coolant of an engine cooling system, the steps of:
    operating the engine;
    determining that the thermostat of the engine is open;
    allowing gas to escape from the cooling system through a small orifice of a known size; and
    measuring the pressure across the orifice.

4. Apparatus for providing a measure of the gas in the coolant of an engine cooling system having a thermostat with a rated operating temperture, comprising:
    a fixture including an orifice adapted to be disposed to connect said orifice in gaseous communication wit a gas-accumulating portion of the engine cooling system;
    pressure sensing means in gaseous communication with said fixture for measuring the pressure across said orifice and for providing a pressure signal indicative thereof;
    temperature sensor means adapted to be disposed with respect to the cooling system of the engine to sense the temperature of the coolant therein and provide a temperature signal indicative thereof; and
    processing apparatus operative with said fixture means and said sensor means disposed as described hereinbefore for determining in response to said temperature signal that the coolant of the temperature in said cooling system exceeds the rated thermostat operating temperature thereof, and in response thereto, sampling said pressure signal and providing a manifestation of the pressure indicated thereby.

5. Apparatus according to claim 4 wherein said processing apparatus includes means for sampling said pressure signal after a time interval of on the order of several seconds following the determination that the temperature of the coolant exceeds the rated thermostat operating temperature of the cooling system under test.

* * * * *

UNITED STATES PATENT AND TRADEMARK OFFICE
CERTIFICATE OF CORRECTION

PATENT NO. : 4,102,178
DATED : July 25, 1978
INVENTOR(S) : Henry J. Mercik, Jr.; Henry E. Goetsch It is certified that error appears in the above-identified patent and that said Letters Patent are hereby corrected as shown below:

| | |
|---|---|
| Column 2, line 47 | "sub-cycle" should read --sub-cyclic-- |
| Column 2, line 62 | "of" should read --or-- |
| Column 4, line 30 | "displaced" should read --displayed-- |
| Column 4, line 48 | "one" should read --once-- |
| Column 5, line 51 | "outer" should read --out-- |
| Column 6, line 24 | "counter" should read --counted-- |
| Column 6, line 65 | "is" should read --it-- |
| Column 7, line 33 | "desired" should read --desirable-- |
| Column 8, line 19 | "time" should read --timer-- |
| Column 8, line 20 | "time" should read --timer-- |
| Column 10, line 27 | "but" should read --But-- |
| Column 10, line 28 | "a" should read --as-- |
| Column 12, line 6 | "wit" should read --with-- |

Signed and Sealed this

Sixth Day of March 1979

[SEAL]

Attest:

RUTH C. MASON
Attesting Officer

DONALD W. BANNER
Commissioner of Patents and Trademarks